INVENTOR
HAROLD J MUMMA
BY Francis W. Anderson
ATTORNEY

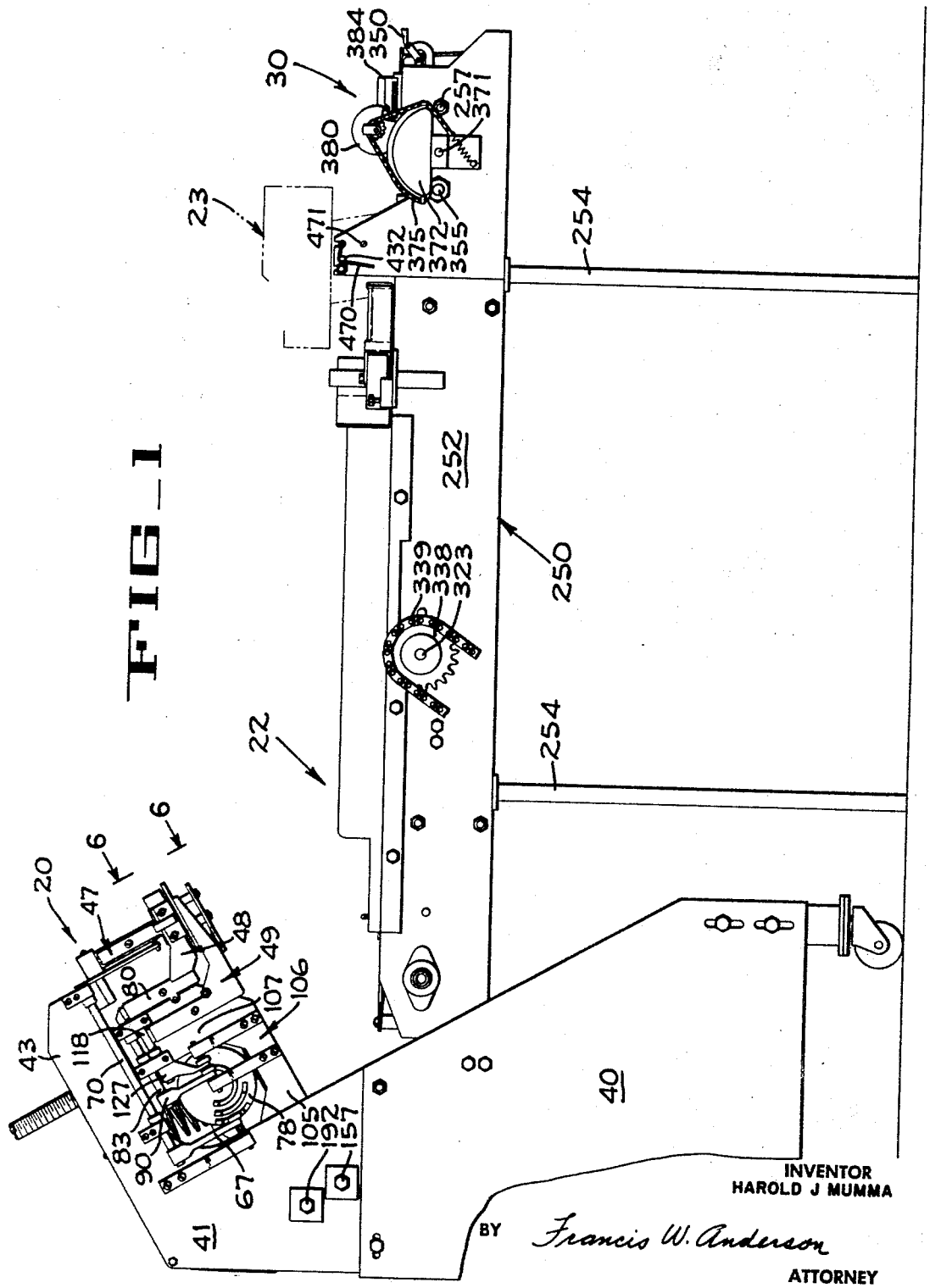

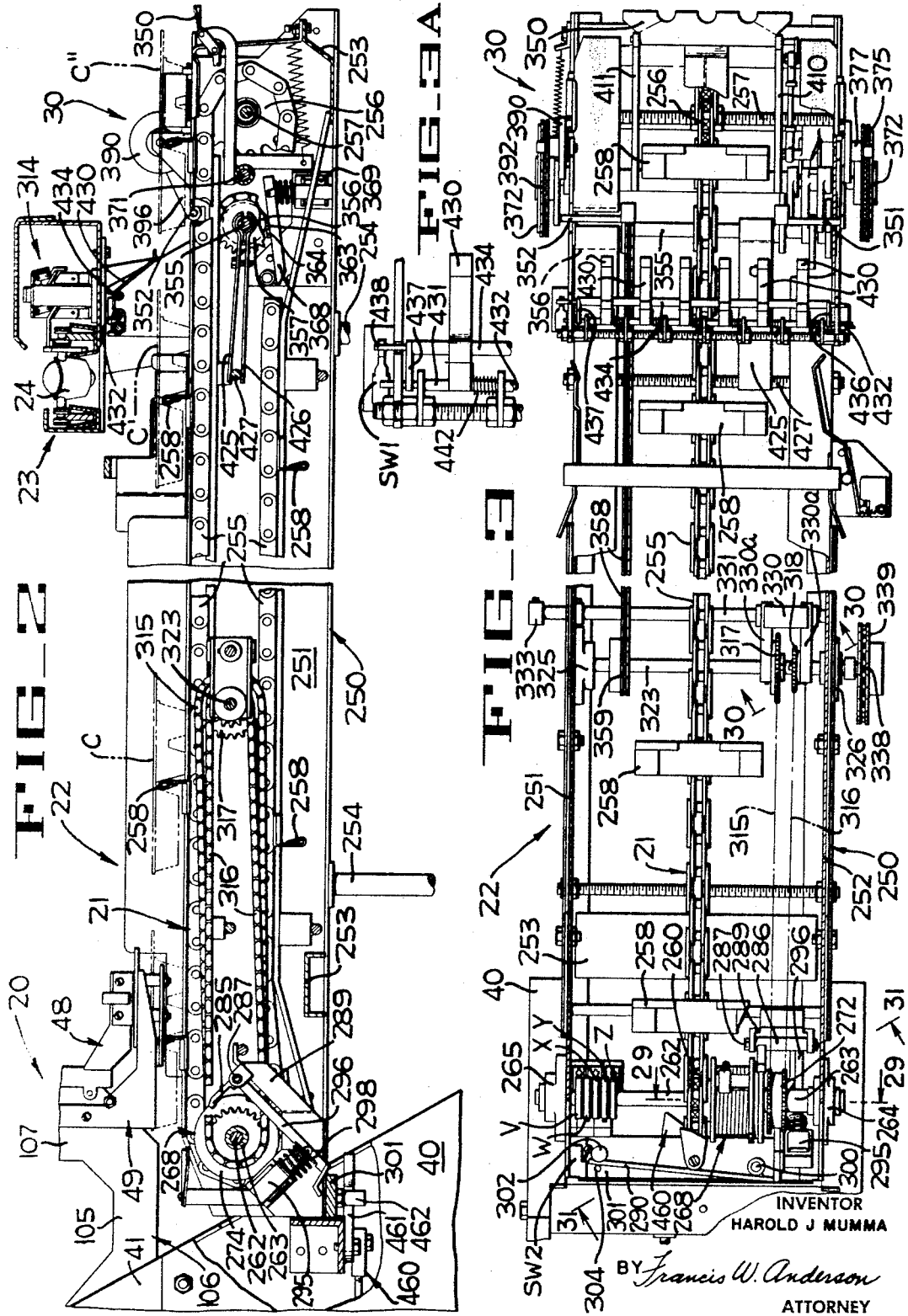

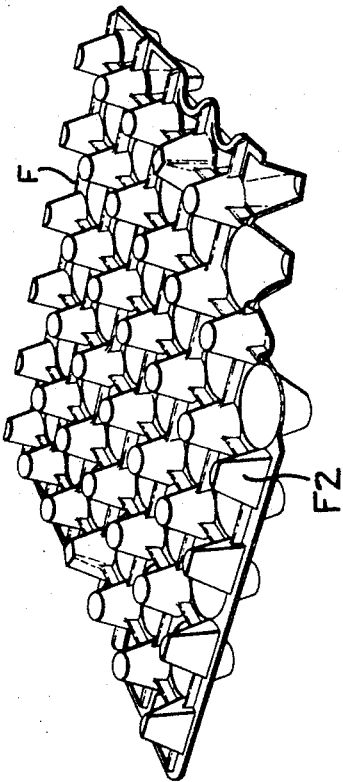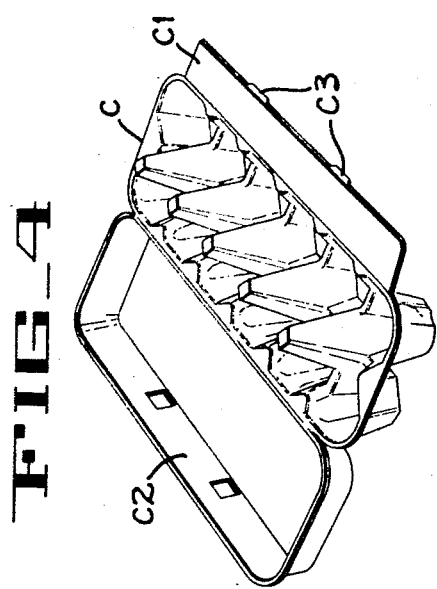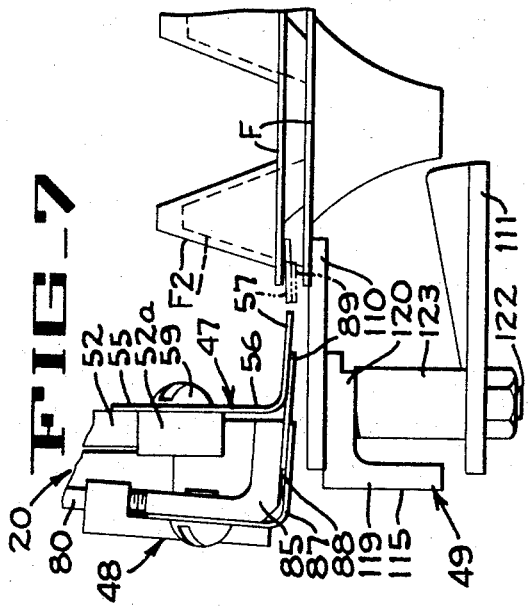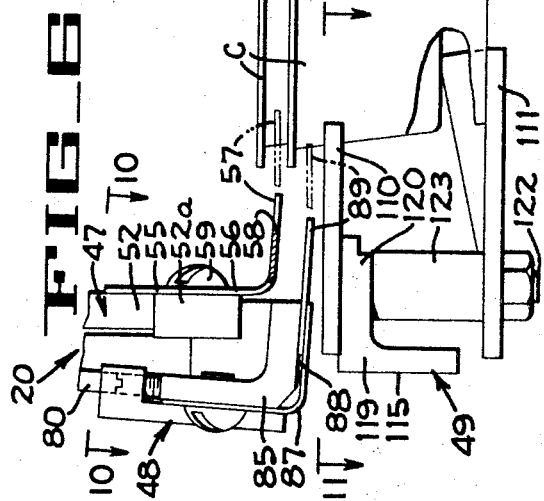

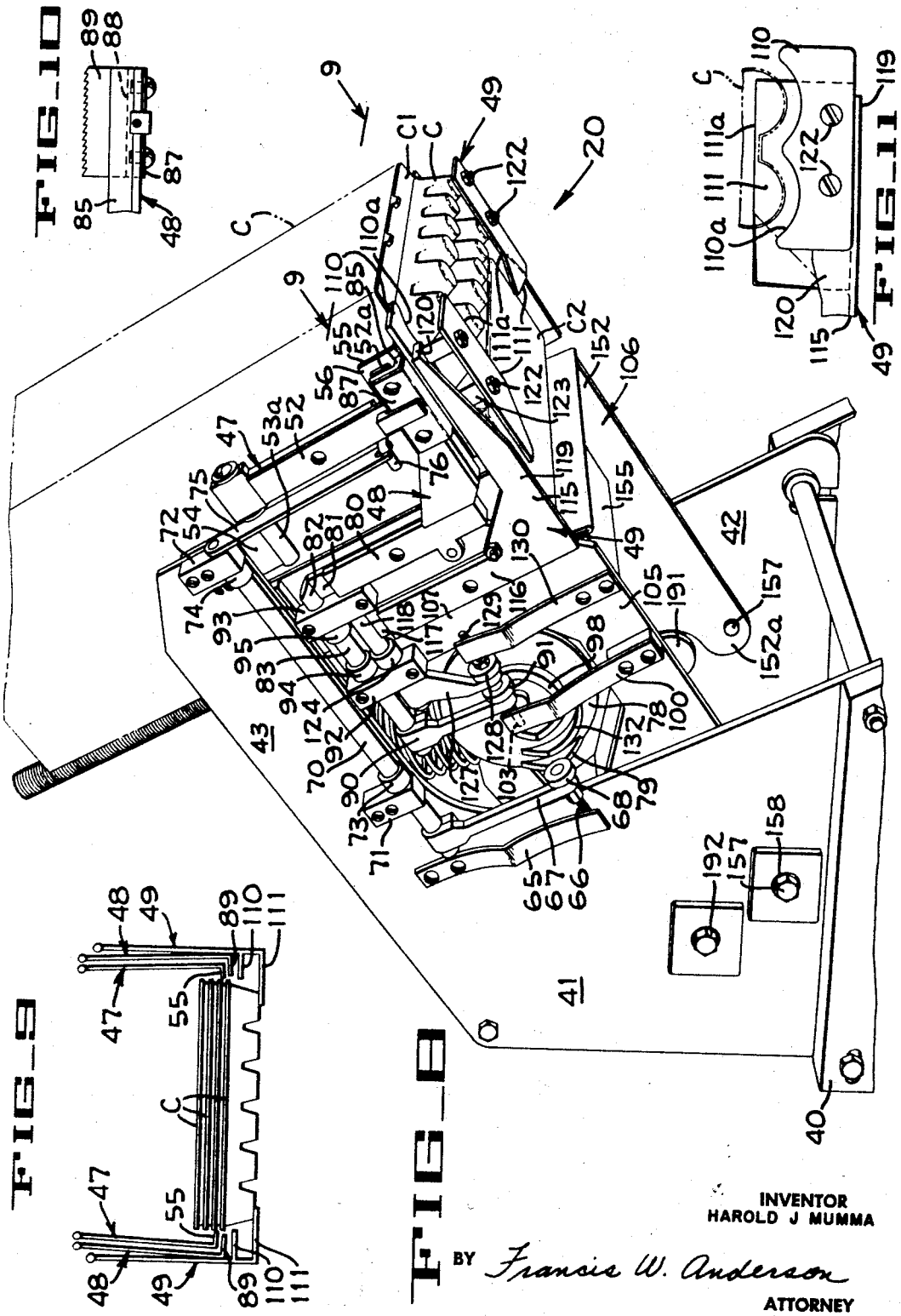

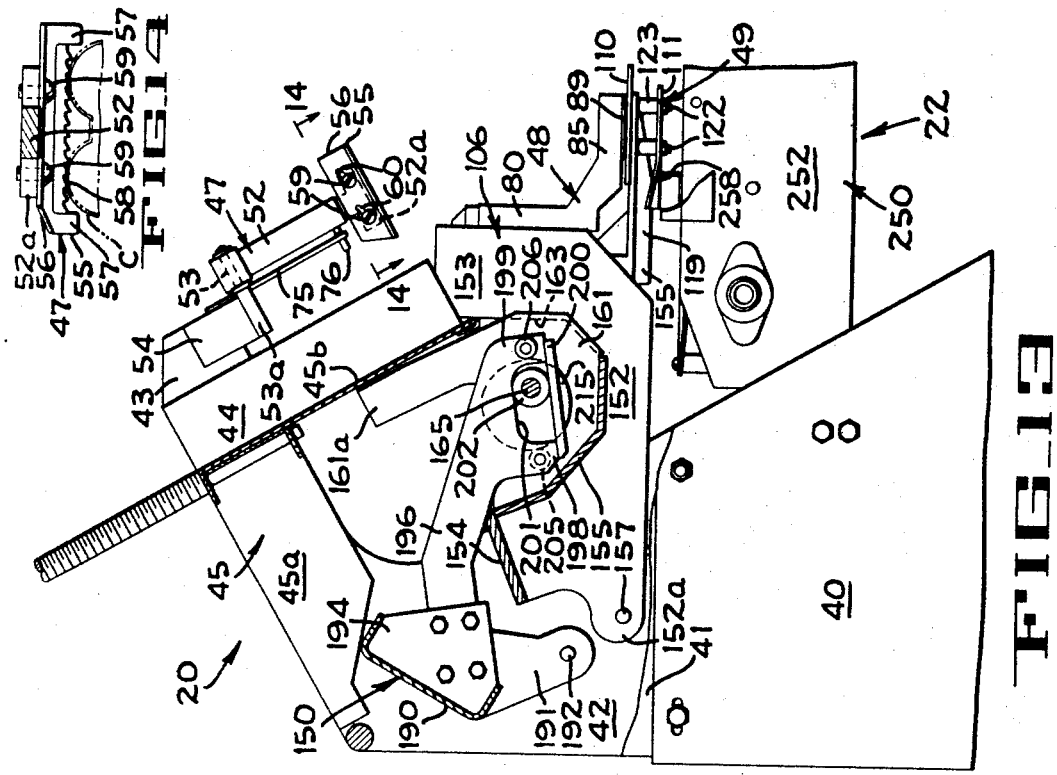

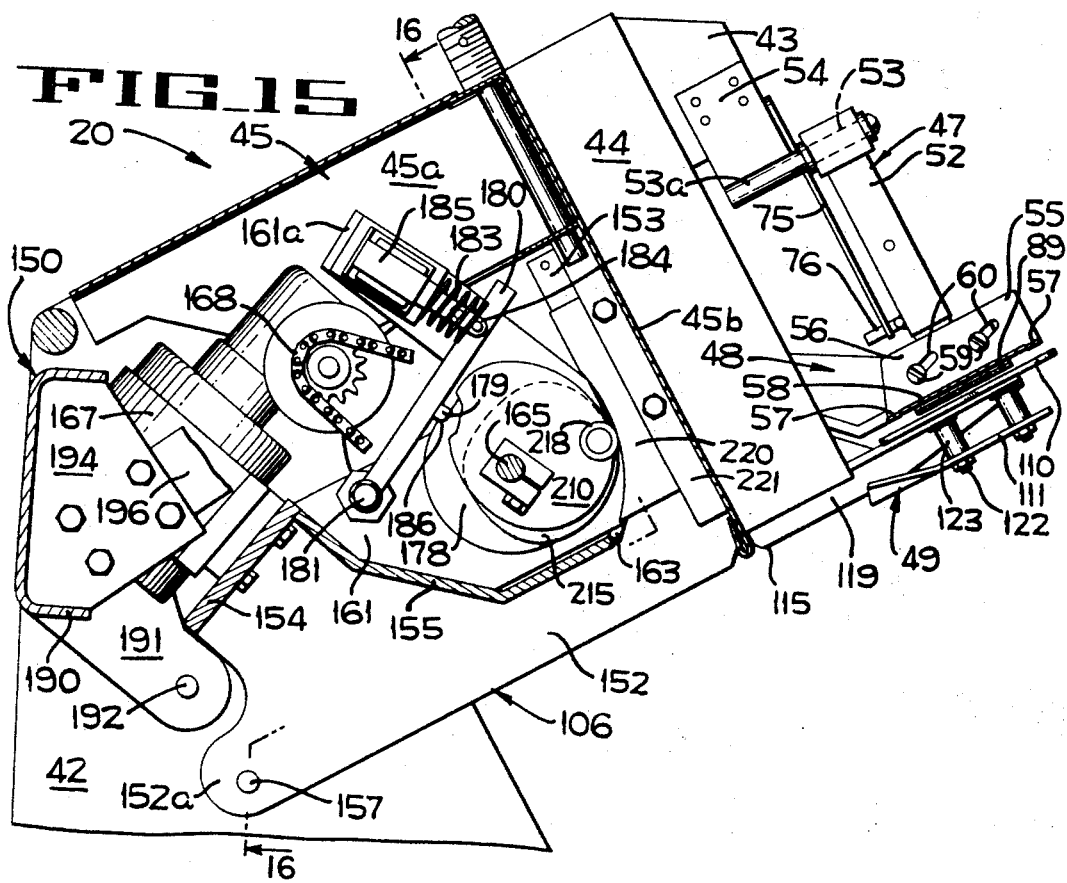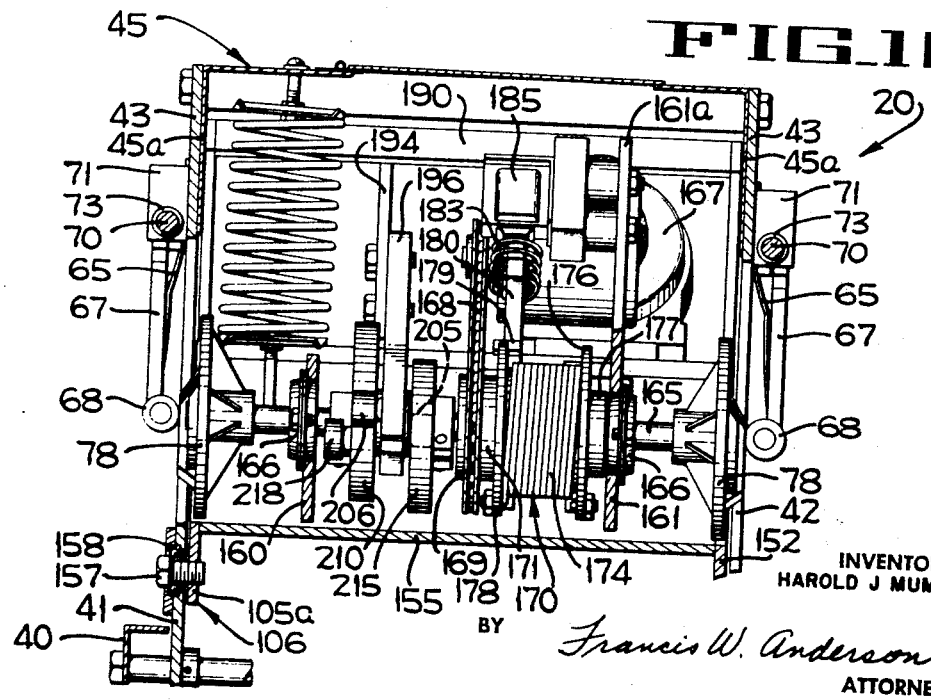

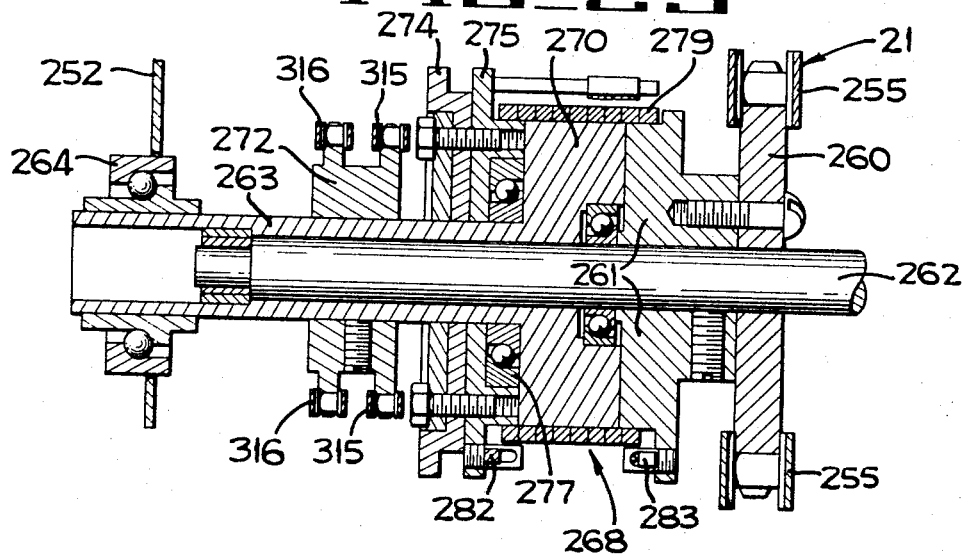
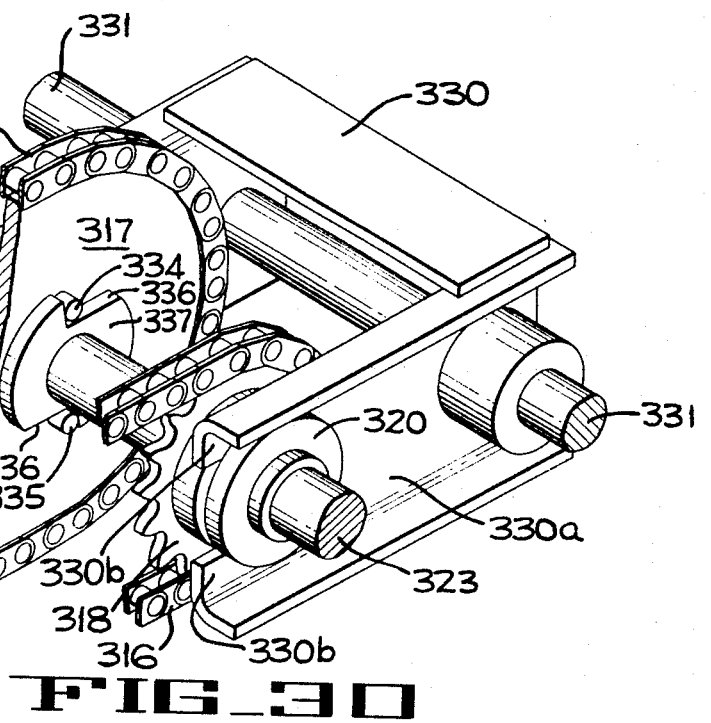

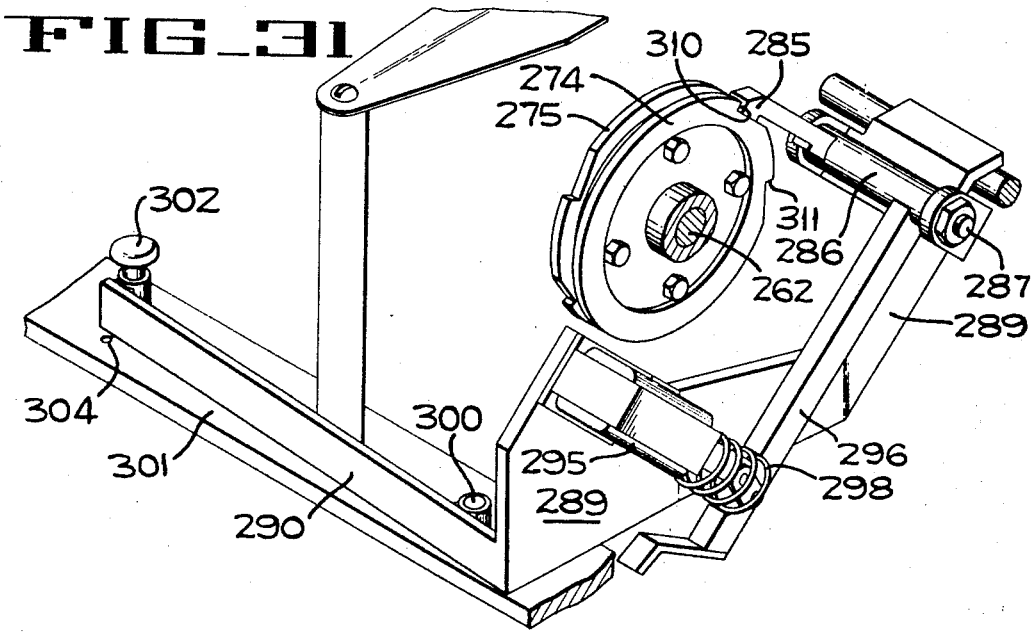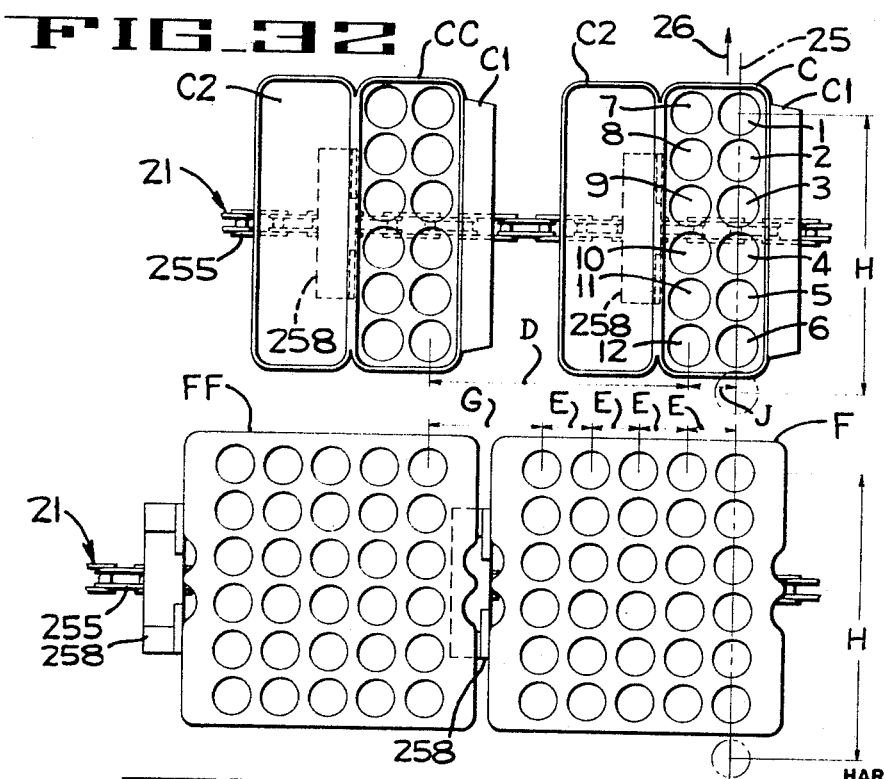

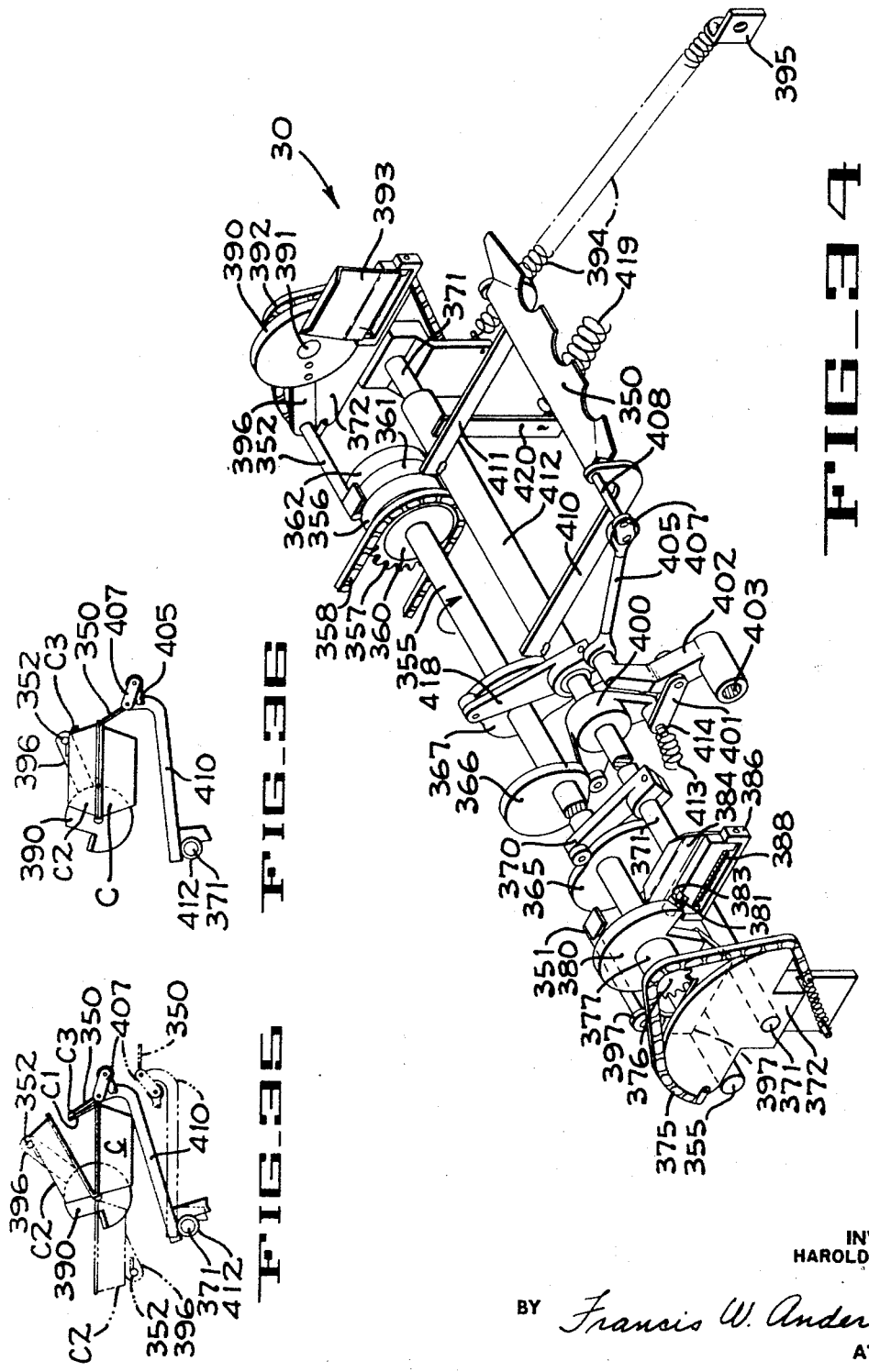

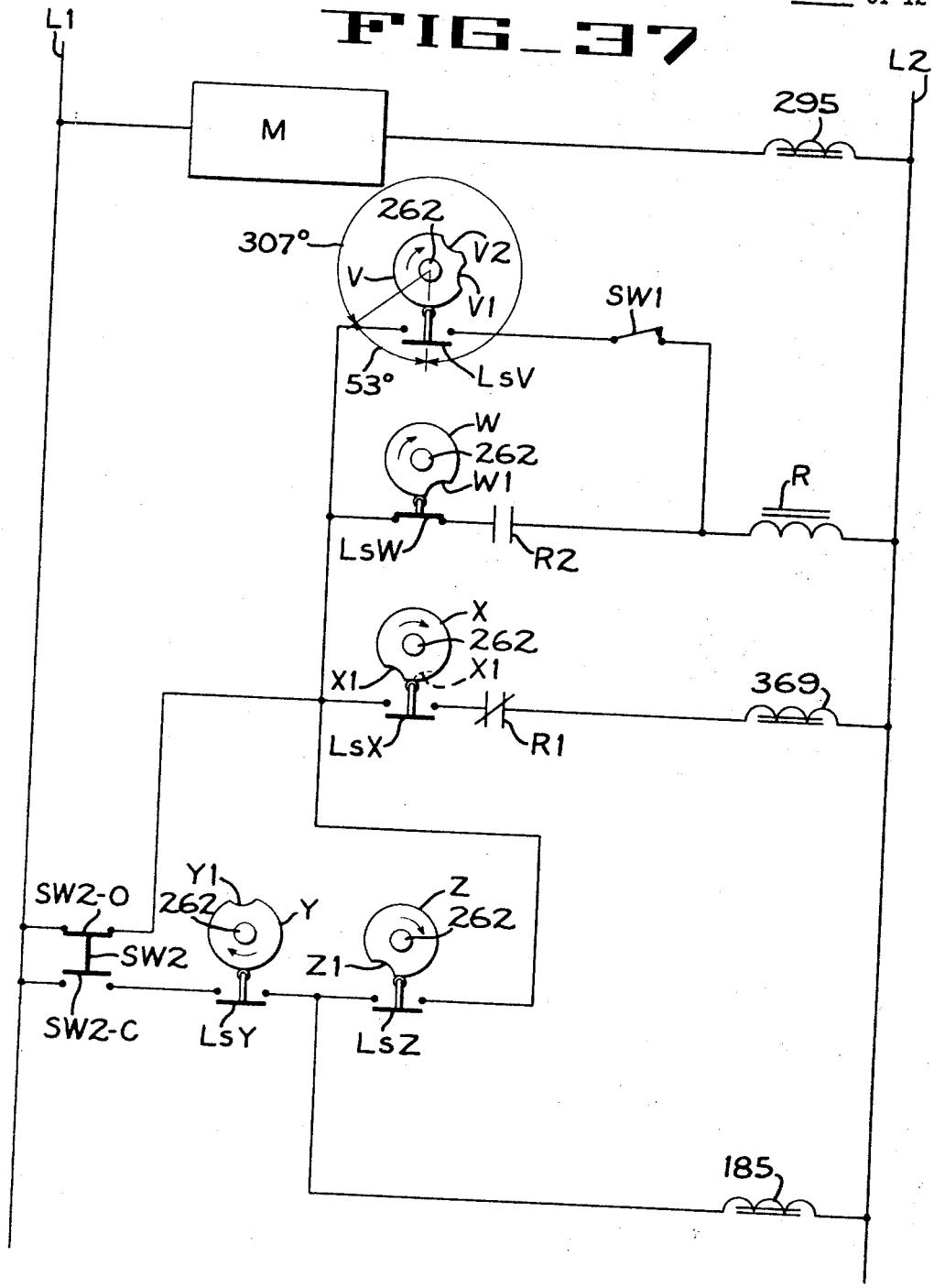

United States Patent Office 3,447,282
Patented June 3, 1969

3,447,282
CONTAINER HANDLING APPARATUS
Harold J. Mumma, Riverside, Calif., assignor to FMC Corporation, San Jose, Calif., a corporation of Delaware
Filed Feb. 3, 1966, Ser. No. 524,901
Int. Cl. B65b 57/00, 35/30; B67b 3/26
U.S. Cl. 53—75          16 Claims

ABSTRACT OF THE DISCLOSURE

A container dispenser is arranged to carry either a nested stack of filler flats or a nested stack of egg cartons and to feed containers successively off the bottom of the stack to an underlying, intermittently driven conveyor. The conveyor indexes the containers to a position beneath an egg discharge conveyor which is arranged to individually drop eggs into the pockets of a container until a row thereof is filled, at which time the container will be indexed forwardly to allow the succeeding row or succeeding container to be filled in a similar manner. An egg carton closing mechanism is positioned at the downstream end of the conveyor to close and lock the covers on the egg cartons, and means are provided to vary the speed of the conveyor and the size of the intermittent indexing movements of the conveyor when the apparatus is changed from operation with filler flats to operation with cartons, or vice versa.

Cross-reference to related application

The present invention concerns container handling apparatus which is disclosed but not claimed in United States patent application Ser. No. 524,399, now Patent 3,403,816 of Ernest A. Verrinder and Boyd W. Rose, filed on even date herewith.

This invention relates to container handling apparatus and, more particularly, concerns an improved mechanism for removing containers one by one from a storage magazine and advancing them in a particular direction.

An object of this invention is to provide an improved container dispenser.

Another object is to provide an efficient operating mechanism for a container dispenser.

Another object is to provide a conveyor adapted to selectively convey egg cartons or egg flats.

A further object is to provide an improved drive mechanism for a conveyor.

Another object is to provide an efficient carton closing mechanism.

Other and further objects and advantages will be apparent from the following description taken in connection with the accompanying drawings, in which:

FIGURE 1 is a diagrammatic side elevation of the container dispenser and conveyor of the present invention.

FIGURE 2 is a fragmentary side elevation, partly broken away and partly in section of the apparatus of FIGURE 1.

FIGURE 3 is a fragmentary plan of the apparatus of FIGURE 2.

FIGURE 4 is a perspective of a carton of the type handled by the dispenser of FIGURE 1.

FIGURE 5 is a perspective, partly broken away, of an egg flat.

FIGURE 6 is an enlarged front elevation of a portion of the dispenser of FIGURE 1, the view being taken looking in the direction of arrows 6—6 of FIGURE 1, one position of the fingers of the dispenser being shown during operation with egg cartons of the type shown in FIGURE 4.

FIGURE 7 is a view similar to FIGURE 6 but showing the fingers during operation with egg flats of the type shown in FIGURE 5.

FIGURE 8 is an enlarged fragmentary perspective of a portion of FIGURE 1.

FIGURE 9 is a diagrammatic front elevation of the control fingers of the dispenser of FIGURE 8, the view being taken looking in the direction of arrows 9—9 of FIGURE 8.

FIGURE 10 is a fragmentary plan, at reduced scale, of a portion of one of the fingers, the view being taken looking in the direction of arrows 10—10 of FIGURE 6.

FIGURE 11 is a fragmentary plan, at reduced scale, of a portion of one of the fingers, the view being taken looking in the direction of arrows 11—11 of FIGURE 6.

FIGURE 12 is an enlarged diagrammatic side elevation of the dispenser of FIGURE 1, with parts broken away.

FIGURE 13 is a view similar to FIGURE 12 but showing the mechanism in a different operating position.

FIGURE 14 is an enlarged section taken along lines 14—14 of FIGURE 13.

FIGURE 15 is an enlarged vertical section through the dispenser, particularly showing the drive mechanism for lowering certain fingers of the dispenser.

FIGURE 16 is a vertical section taken substantially along line 16—16 of FIGURE 15.

FIGURE 29 is an enlarged vertical section taken along line 29—29 of FIGURE 3.

FIGURE 30 is an enlarged fragmentary perspective, the view being taken looking substantially in the direction of arrows 30—30 of FIGURE 3.

FIGURE 31 is an enlarged fragmentary perspective of a portion of the conveyor drive mechanism, the view being taken looking generally in the direction of arrows 31—31 of FIGURE 3.

FIGURE 32 is a diagrammatic plan of cartons being advanced on the container conveyor.

FIGURE 33 is a diagrammatic plan of egg flats being advanced on the container conveyor.

FIGURE 34 is an exploded perspective of the carton closing mechanism of the present invention.

FIGURES 35-36 are diagrammatic views showing the closing of a carton.

FIGURE 37 is a schematic illustration of the electrical switching circuitry embodied in the apparatus of the present invention.

Figure 17:
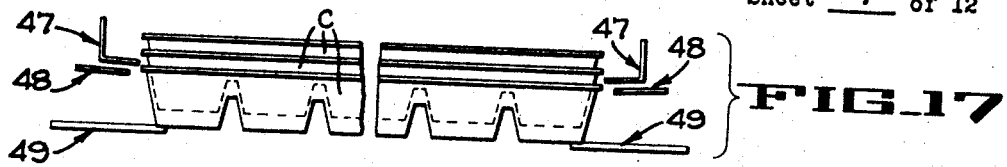
FIGURES 17-22 are schematic showings of the fingers of the dispenser, showing various positions of the fingers during the dispensing of a carton.
Figure 18:

The embodiment of the invention chosen for disclosure in FIGURES 1–3 comprises a de-nester unit 20 which is adapted to hold a plurality of egg containers, either cartons C (FIG. 4) or flats F (FIG. 5), in nested relation and to deposit them one-by-one on an endless conveyor member 21 of a container-advancing unit 22. Each container is intermittently advanced from left to right (FIGS. 2 and 3) and eventually each transverse row of pockets of the container is stopped under an egg-delivery conveyor 23 (FIG. 2) which is provided with a series of operable egg carrier buckets 24 disposed in single file. This conveyor 23 is part of an egg-processing machine, such as that disclosed in the patent to Mumma No. 2,895,274, in which eggs are inspected and graded and delivered to the single file bucket conveyor 23. It will be understood that the combination container-de-nester and delivery assembly of FIGURE 1 is one of several units that are placed side by side so that they can all receive eggs from the same egg-delivery conveyor 23. The discharge of eggs from the conveyor 23 is under control of a memory system in the main egg processing machine and, accordingly, the conveyor is arranged to deliver eggs of different grade to each of the several container-de-nesting and advancing assemblies. The eggs are dropped one by one in each row of the container starting at the downstream end of the row. For example, referring to FIGURE 32, when cartons C are being filled, the buckets 24 move along the path indicated by phantom line 25 in the direction of arrow 26 and are arranged to drop eggs one by one sequentially into pockets No. 1–6. When pocket No. 6 is filled, the carton is quickly indexed a distance X and the next egg in the bucket conveyor of the particular grade being deposited in the carton, is dropped in pocket No. 7.

When cartons are being filled, each carton is advanced to a position adjacent a carton closing mechanism 30 (FIG. 1) that folds a forward locking flange C1 (FIG. 4) of the carton upwardly and then swings a cover C2 of the carton down over the eggs and into locked engagement with the locking flange. When flats are being filled, the closing mechanism 30 is de-activated since the flats do not have a cover.

The de-nester unit 20 is adapted to dispense either cartons or flats and, in general, it comprises a wheeled support frame 40 (FIG. 1) having two rigid side walls 41 and 42 (FIG. 8) that are held in fixed spaced relation by rigid cross braces. Each side wall has an upper, outwardly-extended arm 43, the forward portion of which has a plate 44 (FIGS. 12–13) rigidly secured thereto in depending relation to form one wall of a magazine in which the containers are temporarily stored. An internal support housing 45 (FIGS. 12–13) is mounted between the two spaced arms 43, said housing including a plate 45a welded to the inner face of each arm 43 and a plate 45b that is disposed at an angle to the vertical and welded between the two plates 45a to form the rear wall of the magazine. The containers are disposed in superposed nested relation in the magazine, as indicated in phantom lines in FIGURE 8 and diagrammatically in FIGURE 9.

The containers are retained in the magazine and dispensed therefrom by three pairs of fingers 47, 48 and 49 (FIG. 9), each pair including a finger disposed adjacent side wall 41 that is a mirror image of the finger on the side wall 42. Since the fingers and their actuating mechanisms are identical, only oppositely disposed, a description of the finger of each pair that is associated with only one of the side walls will be described.

The upper finger 47 associated with wall 42 (FIG. 15) includes an arm 52 that is pivotally mounted on a cylindrical rod 53 which has an enlarged portion 53a welded to a plate 54 which is, in turn, secured by screws to the end portion of the extension 43 of the magazine side wall. The finger 47 also includes an angle plate 55 which comprises an upright wall 56 and a pair of container support ledges 57 that are normal to the wall 56 and project inwardly of the magazine. An inner serrated surface 58 is provided between the ledges 57. The angle plate is secured to an enlarged lower end portion 52a of the arm 52 by capscrews 59 that extend through slots 60 in the upright wall 56 and are threaded into the lower arm portion 52a. The slots 60 make it possible to adjust the vertical position of the angle plate 55. This adjustment is necessary because the ledge 57 must have a different position when cartons are being dispensed than when flats are being dispensed.

The upper finger 47 is urged inwardly of the magazine by means of a leaf spring 65 (FIG. 8). For purposes of clarity the actuating mechanism for the upper finger 47 associated with wall 41 (FIG. 8) will be described rather than that associated with wall 42. The spring 65 is secured to the magazine side wall and has a lower end bearing against a threaded pin 66 which is secured to the lower end of a lever 67 and carries a rotatable cam follower roller 68. The lever 67 is clamped on one end of a shaft 70 which is rotatable in two spaced bearings 71 and 72 and is held in place by two set collars 73 and 74, that are secured to shaft 70. A second lever 75 is secured in any suitable manner to the other end of shaft 70 for rotation therewith. The second lever 75 has a slot at its lower end that receives an offset end of a pin 76 which is carried by the arm 52.

The roller follower 68 rides along the surface of a rotatable face cam 78 that has a raised camming track 79. As the cam rotates, the track 79 passes under the roller follower 68 and swings the lever 67, the shaft 70 and the lever 75 in a clockwise direction (FIG. 8), causing the upper finger 47 to be swung outwardly of the magazine. When the track 79 passes from underneath the follower 68, the spring 65 urges the lever 67, the shaft 70 and the lever 75 counterclockwise to move the angle plate 55 inwardly of the magazine to a position under the peripheral edge of the carton or flat.

The middle finger 48, that is associated with wall 41, comprises a lever 80 that is secured to a plate 81 which is welded to a flattened end 82 of a shaft 83. The finger 48 includes an angle bar 85 that is welded to the lower end of lever 80. A second angle member 87 is secured to the angle bar 85, said member 87 having an upwardly projecting abutment member 88 against which an inner edge of a toothed stripper or container-separator member 89 abuts. The stripper is locked between the angle bar 85 and the member 87 and the points formed on its inner edge are adapted to grip side surfaces of a container so that, when the stripper is lowered, the lowermost container of the stack of containers is moved downwardly away from the nested containers thereabove.

The middle finger 48 is moved toward and away from the containers in the magazine by means of a lever 90 (FIG. 8) that has a cam follower roller 91 on its lower end and is clamped on shaft 83. The shaft 83 is journalled for rotation in spaced bearings 92 and 93, and held in place by set collars 94 and 95. The cam follower roller 91 rides on the surface of the rotary cam 78 and, when a camming strip 98 passes under roller 91, the lever 90, the shaft 83 and the lever 80 are swung clockwise (FIG. 8) to move the middle finger 48 away from the containers. When the camming strip 98 passes from under the roller 91, a spring 100 swings the lever 90 and the finger 48 inwardly, the spring 100 having one end portion bearing against a pin 103, that is carried by lever 90, and an opposite end secured to a wall 105 of a pivot housing 106. It is to be noted that the wall 105 has an upwardly projecting plate portion 107 on which the bearings 92 and 93 are mounted.

The lower finger 49 is a composite member having an upper filler flat support member 110 adapted to support a stack of filler flats and a lower carton support member 111 adapted to support a stack of cartons. While these two members are fixed parts of the lower finger member 49, they are used alternately, as shown diagrammatically in FIGURES 6 and 7. Also, it should be noted in FIGURE 11 that the carton support member 111 has a straight inner edge 111a while the filler flat member 110 has a scalloped edge 110a.

The lower finger 49 comprises an arm 115 (FIG. 8) having an upper portion 116 bolted to a plate 117 that is welded to a shaft 118. A portion 119 of arm 115 projects at right angles to the member 116 and is provided with a flat strap 120 on which the filler flat support member 110 is secured by two bolts 122 that extend through the filler flat member 110 and the strap 120, and through spacer sleeves 123 to mount the carton support member 111.

The shaft 118 is journalled for rotation in the bearings 92 and 93 and held in place by a set collar 124 on one side of bearing 92 and a lever 127 positioned on the other side of the bearing. The lever 127 is clamped on shaft 118 and has, at its lower end, a cam follower roller 128 mounted on a stud 129. A spring 130 is anchored on the wall 105 of the pivot housing 106 and has an end portion bearing against the stud 129 to pivot lever 127 and move the lower finger inwardly toward the containers in the housing. The follower roller 128 rides along the surface of the rotary cam 78 and, when it rides up a camming strip 132 carried by the cam, the lower finger unit is swung outwardly of the magazine and away from the containers therein. When the strip 132 moves out from under the roller 128, the spring 130 swings the finger unit 49 inwardly.

Referring to FIGURES 12 and 13, it will be seen that the upper finger units 47 are part of the fixed structure and always remain in substantially the same vertical position. On the other hand, the middle finger units 48 and the lower units 49 move downwardly to strip the lowermost container from the magazine and position it on the container-advancing conveyor 22. This oscillating movement of the units 48 and 49 is accomplished by the conjoint action of the pivot housing 106 (FIGS. 12–13) on which finger units 48 and 49 are mounted and a control housing 150. The pivot housing 106 includes the wall 105 (FIG. 8) and an identical wall 152 that is spaced from wall 105 and is connected thereto by transverse plates 154 and 155 (FIG. 15) to form a rigid pivot member. The side wall 152 has a lower end portion 152a pivotally mounted on the fixed wall 42, an upstanding wall 153 on which bearings are mounted, and the side wall 105 has a similar lower end 105a (FIG. 16) pivoted on the fixed side wall 41. Each of these pivot connections is provided by a screw 157 that is threaded into the lower end portions 105a or 152a, and has its head bearing against the inner race of an anti-friction bearing unit 158 carried by the housing wall.

The pivot housing 106 includes a pair of vertical plates 160 and 161 (FIG. 16). As seen in FIGURE 13, the plate 161 is welded to the transverse plate 155 and is connected to the wall 152 by a laterally extending brace 163. The plate 161 has an upwardly extending arm 161a integrally formed thereon. Plate 160 is welded in place in the same manner as plate 161 and is identical to plate 161, except that it has no upwardly projecting arm similar to arm 161a. A shaft 165 is rotatably supported by the two plates 160 and 161, being disposed in a bearing 166 (FIG. 16) mounted in each plate. The shaft 165 is driven from a motor 167 through a chain 168 that is trained around a sprocket 169 of a clutch unit 170. This clutch is an over-running clutch of the type disclosed in the patent to Mumma No. 3,112,023 and in general comprises a drive member 171 on which the sprocket 169 is formed and which has a cylindrical member disposed inside a coil spring 174. A driven member 176, which has a hub 177 setscrewed to the shaft 165, also has a cylindrical portion underlying the spring 174. One end of the spring 174 is connected to the driven member 176 while the other end is anchored in a ratchet wheel 178 that is freely rotatable on the drive member 171. The ratchet wheel 178 is controlled by a pawl 179 (FIG. 15) carried by a lever 180 which is pivotally mounted on the plate 161 by means of a mounting member 181. A spring 183 disposed around the plunger 184 of a solenoid 185 urges the lever 180 in a clockwise direction (as viewed in FIG. 15) to keep the pawl in front of a trailing wall 186 provided by a notch in the ratchet wheel.

When the motor is running, the drive member 171 is continuously rotated in a clockwise direction about the shaft 165 (FIG. 15). When the pawl 179 is in the notch of the ratchet wheel, the coil spring 174 is subjected to an unwinding stress by the frictional engagement of the rotating member 171 and this stress tends to enlarge the diameter of the spring and maintain the spring out of driven engagement with the drive member 171. When the solenoid 185 is energized, the plunger 184 pivots lever 180 counterclockwise (FIG. 15) to disengage the pawl 179 from the ratchet wheel. The spring 174 may now contract to its normal diameter and grip the rotating member 171. Since one end of the spring is connected to the stationary driven member 176, the inertia of member 176 causes the spring to wind tightly around the rotating member 171 and rotate with it, forcing the driven member 176 to also rotate. During operation, the solenoid is energized only for the very short time necessary to withdraw the pawl from the notch in the ratchet wheel. As soon as the shaft 165 starts to rotate the solenoid is de-energized and the spring 183 urges the lever clockwise (FIG. 15). As a result, the rotation of the shaft 165 is arrested after one complete revolution.

The previously described rotary face cams 78 are keyed to opposite ends of the shaft 165 so that, when the shaft 165 is rotated through one complete revolution, the face cams 78 are also rotated through 360 degrees.

The control housing 150 (FIG. 12) comprises a transverse channel 190 that is welded to two arms 191 (one only being shown), each arm 191 being disposed close to one of the fixed side walls 41 and 42 and pivotally connected thereto by studs 192 which are mounted in the walls in the manner explained in connection with the studs 157 which mount the pivot housing 106. A vertical plate 194 is welded to the channel 190 and projects forwardly therefrom at a point intermediate the ends of the channel, as seen in FIGURE 16. A control arm 196 is bolted to and projects forwardly from the mounting plate 194. At its forward end the arm 196 is provided with a recess defined by two spaced arms 198 and 199. A plate 200 is secured across the ends of the arms 198 and 199 to close the recess and form a slot 201 that receives a roller 202 which is rotatable on the shaft 165.

Two rollers 205 and 206 are rotatably mounted on arm 196 adjacent the slot 201, roller 205 being adjacent one face of arm 196 while roller 206 is adjacent the other face of the arm. The roller 206 rides along the surface of a generally-oval lowering cam 210 which is shown in phantom lines in FIGURE 12 because it is ahead of the plane of section of FIGURE 12. The cam 210 is set-screwed to shaft 165 in eccentric relation thereto and the cam 210 is so configurated that when shaft 165 is rotated, the cam 210 bears against roller 206 and causes the arm 196 of the control housing to swing clockwise and downwardly (FIG. 12). Since the roller 202 is trapped in slot 201 and is part of the pivot housing 106, the pivot housing must move downwardly also.

The roller 205 rides along the surface of a generally circular cam 215 (FIG. 13) that is secured to the shaft 165 in eccentric relation and is so designed that, during the second half of the rotation of the shaft 165, the cam 215 bears against the roller 205 and urges it upwardly to return the pivot housing to its upper position.

The pivot housing is locked in its up position by means of a roller 218 (FIG. 15) that is carried by the cam 210. When the pivot housing is in the up position, the roller 218 engages a rigid arcuate locking strip 220 that is bolted to a flange 221 which is welded to the back wall 45b of the magazine. Any downward movement of the pivot housing will of course be a downward swinging movement about aligned studs 157. However, since the roller 218 moves with the pivot housing, its engagement with the arcuate surface of the locking strip 220 will prevent such downward movement.

When downward movement of the pivot housing is desired, rotation of shaft 165 will quickly swing the roller 218 out of engagement with the locking strip 220.

Figure 19:
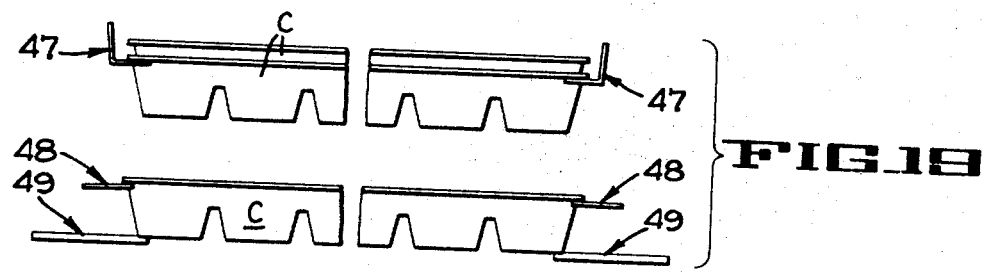
Figure 20:
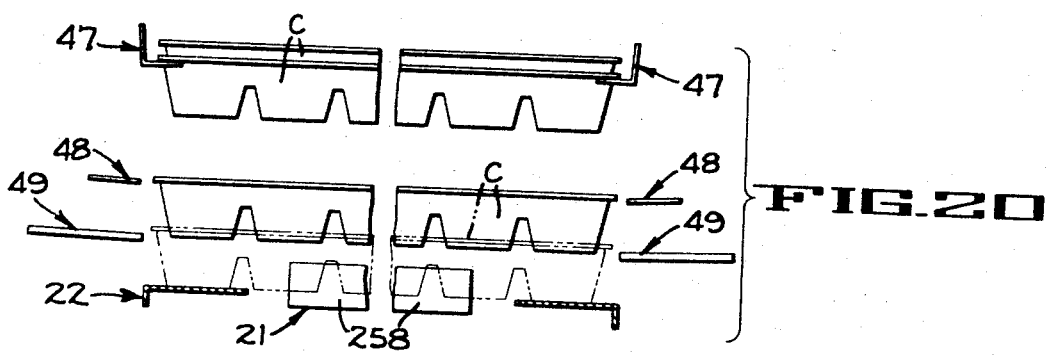
Figure 21:
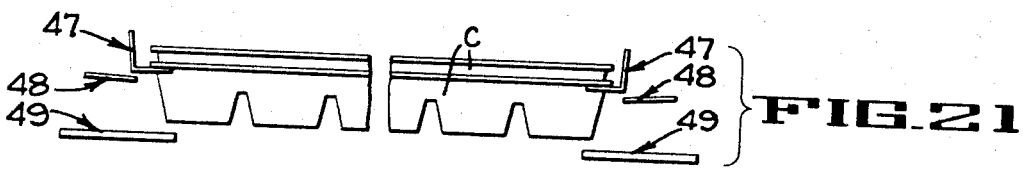
Figure 22:
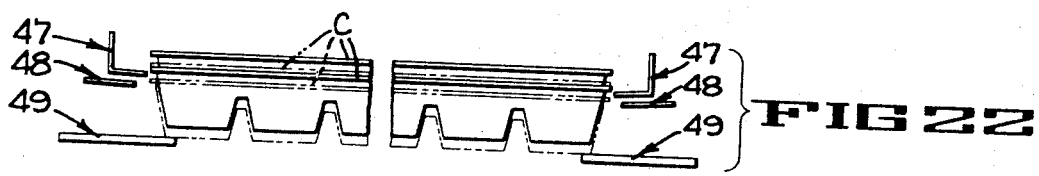
Figure 23:
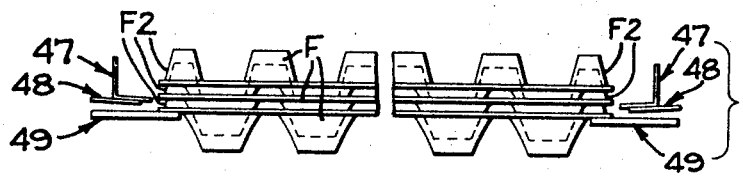
FIGURE 23-28 are schematic showings of the fingers of the dispenser, showing various positions of the fingers during the dispensing of an egg flat.
Figure 24:
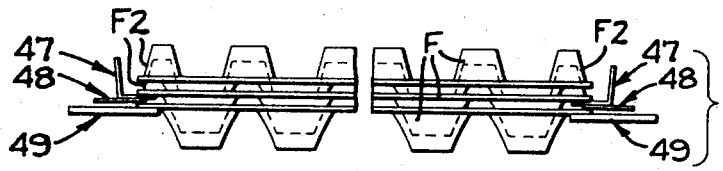
Figure 25:
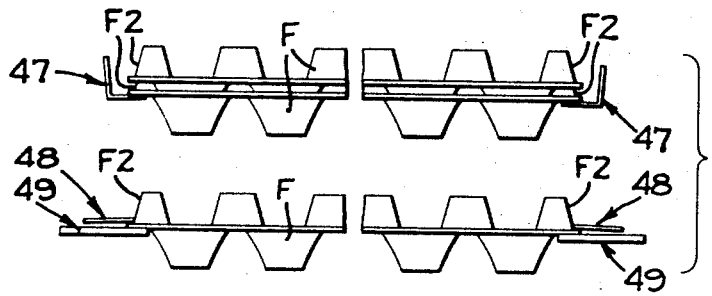

In FIGURES 17–22 the sequence of operations followed by the fingers 47, 48 and 49, when cartons C are being dispensed, is shown diagrammatically. At the beginning of a cycle (FIG. 17) the stack of cartons is held in elevated position by the lower fingers 49. When a signal is received indicating that a carton must be dropped onto the feed conveyor, the solenoid 185 (FIG. 15) is de-energized to withdraw the pawl 179 and permit camshaft 165 to be driven for one complete revolution. During the first 35° of rotation of the camshaft, the upper fingers 47 move into position below the peripheral ledge of the carton that is above the lowermost carton (FIG. 18), while serrated stripper fingers 48 move into gripping engagement with the end surfaces of the lowermost carton. At this time, the pivot housing 106 (FIG. 12) is moved downwardly, carrying the stripper fingers 48 and the lower fingers downwardly to separate the lowermost carton from the stack which is held in elevated position by the upper fingers 47 as shown in FIGURE 19. It should be noted that the serrated or sharpened edge 58 of the fingers 47 (FIG. 14) actually grips the end surfaces of the carton. When the pivot housing reaches a lowered position, the lower fingers 49 are swung outwardly to drop the carton onto the container-advancing conveyor 21. The pivot housing starts upwardly and, during this upward movement, the lower fingers 49 are swung inwardly to their original carton-supporting position (FIG. 21). Finally, the upper fingers 47 are swung outwardly to drop the stack onto the lower fingers 49, as indicated in FIGURE 22.

In FIGURES 23–28, the sequence of movements of the fingers when flats F are being dispensed is shown. At the beginning of the cycle the stack is supported on the lower fingers 49. During the first portion of the rotation of the camshaft, the upper fingers 47 and the stripper fingers 48 are moved into position between the lowermost flat and the flat next above, the sharpened inner edges of the middle fingers being adapted to grip a flattened wall portion F2 (FIG. 5). By comparing FIGURES 17 and 23 it will be seen that in FIGURE 23, when the fingers are adapted for handling flats, each upper finger 47 is closer to the associated stripper finger 48 than it is when cartons are being dispensed. This adjusted position of the upper fingers 47 is obtained by means of the adjustment afforded by the slots 60 (FIG. 13) in the upper finger mountings.

Figure 26:
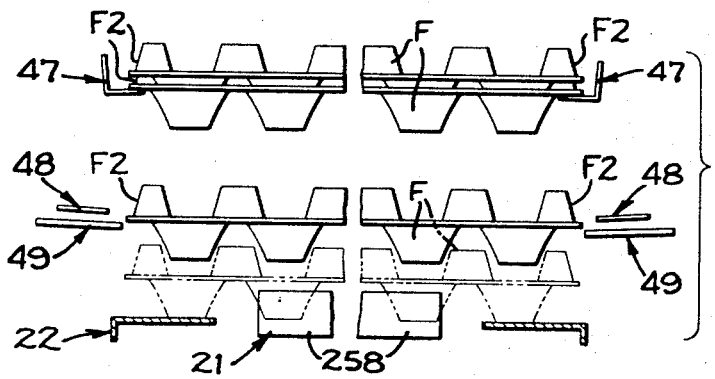
Figure 27:
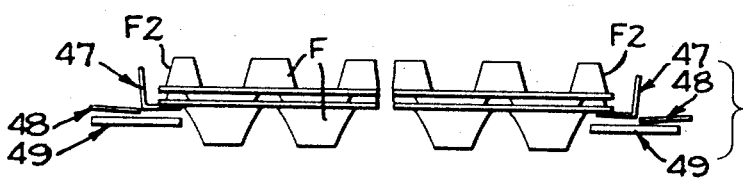
Figure 28:
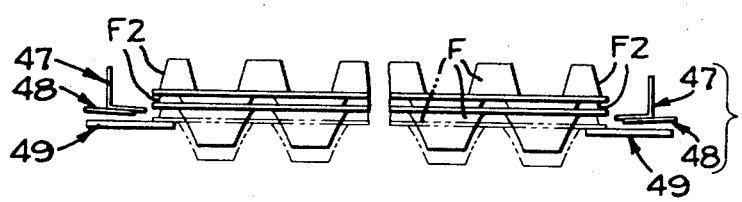

After fingers 47 and 48 are positioned above the lowermost flat, the pivot housing 106 is lowered (FIG. 25) to separate the lowermost flat from the stack. When the pivot housing reaches a lowered position, the fingers 48 and 49 are swung outwardly to drop the lowermost flat onto the conveyor 21 (FIG. 26). As the housing returns upwardly, the lower fingers 49 move inwardly to a position below the stack (FIG. 27) and then the upper fingers 47 are swung outwardly to drop the stack of flats onto the fingers 49.

The conveyor 22 comprises a frame support structure 250 (FIGS. 2 and 3) that includes spaced side members 251 and 252 connected together by rigid transverse braces 253 and supported on posts 254 in conventional manner. The conveyor member 21 comprises an endless chain 255, which has a plurality of upright pushers 258 secured therein and is trained around a sprocket 256 that is rotatably mounted on a threaded shaft 257 extending between the side members 251 and 252 at one end of the frame. At the other end of the frame, the chain is trained around a sprocket 260 (FIG. 29) that is bolted to a driven member 261 which is setscrewed to a drive shaft 262. The drive shaft 262 has one end journalled for rotation in a sleeve 263 that is in turn rotatably mounted in a bearing 264 in the side member 252. At its other end (FIG. 3) the shaft 262 is rotatably journalled in a bearing unit 265 carried by side frame member 251. The shaft 262 is driven through a clutch unit 268 (FIG. 29) of the type disclosed in the patent to Mumma No. 3,112,023 which is incorporated by reference for a description of any parts not specifically described herein. In general the clutch comprises a generally cylindrical driving member 270 that is formed integrally with sleeve 263 to which is secured a double drive sprocket 272. A pair of ratchet wheels 274 and 275 are bolted together and rotatably mounted on the sleeve 263 by a bearing unit 277. A coil spring 279 is wrapped around the driving member 270 and around a portion of the ratchet wheel 275 and of the driven member 261. One end of the spring 279 is secured at 282 to the ratchet wheel unit while the other end is secured at 283 to the driven member 261. Normally the ratchet wheels are prevented from rotating by means of a latching pawl 285 (FIG. 31) that is secured to a sleeve 286 which is rotatable on a bolt 287. The bolt 287 is secured between spaced arms of a bracket 289 carried by a lever 290.

The pawl is moved into and out of engagement with one of the ratchet wheels by means of a solenoid 295 whose plunger is connected to an arm 296 that is integrally formed with and projects from the sleeve 286. When the solenoid is energized, the plunger is withdrawn into the solenoid housing, raising the arm 296 to pivot the sleeve 286 clockwise (FIG. 31) and raise the pawl out of engagement with the ratchet wheel. When the solenoid is de-energized, a spring 298 swings the arm 296 downwardly to move the pawl against the surface of the ratchet which is moving clockwise so that the pawl will fall into the next notch on the ratchet wheel.

The pawl can be shifted from operative engagement with one ratchet wheel to operative engagement with the other by means of the lever 290 which is pivoted on a post 300 projecting upwardly from a fixed frame member 301 of the machine. A retractable locking pin 302 is slidably disposed in one end of the lever 290 and has a small diameter lower end arranged to be positioned in a hole (not shown) in the member 301 to lock the lever in the position illustrated in FIGURE 31 in which the pawl 285 is associated with ratchet wheel 274. If the pin is retracted and the lever 290 is swung counterclockwise, the pin can be positioned in a second hole 304 to lock the lever in the position in which the pawl is associated with the ratchet wheel 275.

As long as the pawl is engaged in a notch of one of the ratchet wheels, the clutch spring 279 (FIG. 29), which surrounds the member 270, is positively restrained from movement in the direction the member 270 is being driven by the double sprocket 272. Frictional contact of the rotating member 270 with the spring subjects the spring to an unwinding stress which increases its diameter so that the spring loses contact with the member 270. As a result, the sprocket 260 is not rotated and the endless chain 255 and the pushers 258 thereon remain stationary.

However, when the pawl is disengaged from the ratchet wheel, the clutch spring 279 may contract to its normal diameter and grip the rotating member 270. Then, as the spring tends to turn with the member 270 while its trailing end is held back by the inertia of the conveyor chain to which it is attached through member 261, the spring is subjected to winding stress which reduces its diameter so that it firmly clutches the rotating member 270 and participates fully in its rotary movement, forcing the sprocket 260 to follow suit. When rotation of the ratchet is blocked by re-engagement of the pawl, the spring is unwound and the conveyor comes to a halt.

It will be noted in FIGURE 31 that the ratchet 274 has two notches 310 and 311. When the solenoid 295 is actuated and the pawl is disengaged from notch 311, the solenoid is immediately de-energized, causing the spring 298 to force the pawl downwardly in time to engage in notch 310. Thus the conveyor will move only a short distance. However, it will be evident that the distance the conveyor moves, from the time the pawl is withdrawn from notch 310 to the time it drops into the notch 311, will be a relatively long one. Thus when the pawl is operatively associated with ratchet 274, the conveyor will advance in alternate long and short increments. The ratchet 275 has five notches that are so spaced around the periphery of the wheel that the conveyor will advance with four short strokes and then one long stroke.

Referring to FIGURE 32, when the buckets of the egg supply conveyor 23 move along the path indicated by phantom line 25 in the direction of arrow 26, the pushers 258 of the feed conveyor must position each row of pockets of the container under the path of the conveyor. The discharge of the conveyor 23 is controlled by a memory device in the egg processing machine and a mechanism 314 (FIG. 2) disposed above the conveyor 23. The eggs are discharged in pockets 1 to 6 in that order. After an egg has been deposited in pocket No. 6, the carton C must be indexed a distance J to position the next row of pockets under the bucket conveyor while the egg following the No. 6 egg moves a distance approximately equal to distance H. When pocket No. 12 is filled, the first row of the next carton CC must be advanced a distance D into position under the bucket conveyor. Thus, when cartons are being filled, the carton conveyor must be moved in alternate short and long increments of movement. Accordingly, the pawl 285 is moved into operative association with the ratchet wheel 274.

Referring to FIGURE 33, it will be seen that, when flats F are being filled, the conveyor must be indexed in sequences of four short increments E and one relatively long increment G. Therefore, when flats are being filled, the pawl 285 is moved into operative association with the ratchet wheel 275.

Two chains 315 and 316 are trained around the double sprocket 272, chain 315 being also trained around a large sprocket 317 (FIG. 3) while chain 316 is trained around a smaller sprocket 318. Sprocket 318 is secured to a slidable bushing 320 (FIG. 30) and sprocket 217 is secured to a similar slide bushing 321. The bushings are slidable on a shaft 323 that is journalled for rotation in bearings 325 and 326 in the frame members 251 and 252 respectively. A yoke 330 is secured to a shaft 331 that is journalled for sliding axial movement in the frame members. Each arm 330a of the yoke 330 has a recess in its outer end defined by two spaced flattened bars 330b which are disposed in an annular slot in one of the slide bushings 320 and 321 to which the sprockets are secured. A knob 333 (FIG. 3) is connected to one end of the shaft 331 for manipulation by an operator in sliding the yoke and the associated sprockets laterally of the frame. When the sprockets are shifted to the right (FIG. 30) along the shaft 323, two drive pins 334 and 335 are moved into notches 336 in a drive member 337 that is secured to the shaft 323 for rotation therewith. The shaft 323 is continuously rotated clockwise (FIG. 30) and accordingly the trailing walls, that define the notches 336, engage the pins 334 and 335, and drive the sprocket 317. When the sprockets are shifted to the left along the shaft 323, two drive pins (not shown), that are identical to the pins 334 and 335 and project outwardly from sprocket 318, are moved into the notches, while the sprocket 317 and pins 334 and 335 are moved away from the drive member 337. The shaft 323 is continuously driven by a sprocket 338 that may in turn be driven by a chain 339 connected to any suitable source of power, as for example, an electric motor, or a drive mechanism of the main egg processing machine.

It will be noted that, since shaft 323 is driven at a fixed speed, the speed with which the double sprocket 272 of the clutch is driven will depend upon whether the large sprocket 317 or the small sprocket 318 is operatively connected to the shaft 323. Referring again to FIGURES 32 and 33, it is evident that the second carton CC must be advanced through the distance D which is greater than the distance G that the second flat FF must travel in the same length of time (measured by the time the bucket conveyor moves the distance H). Accordingly, the large sprocket 317 is engaged with shaft 323 when cartons are being filled, while sprocket 318 is used when flats are being filled. The sprocket 317, 318 and the double sprocket 272 are so chosen that the cartons and flats will be advanced no faster than is necessary to properly position the pockets under the feed conveyor since it is desirable to stop, and start and move the container conveyor as slowly as possible.

In FIGURE 2 a carton C' is shown in phantom lines after it has been stopped in a position in which the second row of pockets is directly below the egg conveyor 23. After this second row has been filled, the next indexing movement of the carton conveyor will bring the carton to the position, indicated by the phantom line showing a carton C", wherein the carton is disposed above the closing mechanism 30. In general this mechanism 30 comprises a plate 350 (FIG. 34) that is effective to pivot upwardly to lift the locking flange C1 (FIG. 35) of the carton, and a pair of lifter fingers 351 and 352 that are effective to swing the cover C2 upwardly to a position overlying the pocketed body of the carton and overlying the locking flange C1 so that protrusions C3 (FIG. 35) on the flange project into openings (FIG. 4) in the cover to lock the cover in closed position.

The closing mechanism comprises a shaft 355 (FIG. 34) that is journalled for rotation in the side walls of the conveyor support structure and is driven through a clutch 356 from a continuously rotating sprocket 357. The sprocket 357 is driven by a chain 358 that is trained around a sprocked 359 (FIG. 3) which is keyed to the rotating drive shaft 323. When the clutch 356 is engaged, the shaft 355 rotates clockwise (FIG. 34), and a carton gripper control cam 365, a locking flange control cam 366, and a lowering mechanism control cam 367 are also rotated clockwise.

The clutch 356 may be of the same type as clutch 170 (FIG. 16). In one arrangement, the clutch 356 is of the type marketed by Curtiss-Wright Corporation of Cleveland, Ohio under the designation of series D-43-6 and in general, it comprises a drive member 360 keyed to the sprocket 357, a release sleeve 361 disposed around a spring (not shown) that surrounds an internal reduced diameter portion of the drive member and surrounds a portion of a driven member 362. A detent 363 (FIG. 2) is formed on the sleeve 361 for cooperation with a pawl 364 carried by a pivotally mounted arm 368. The clutch is engaged by means of a solenoid 369 that is operatively connected to the arm 368 so that, when the solenoid is energized, the pawl is moved out of engagement with the detent, permitting the inner spring to establish driving relation between the drive member 360 and the driven member 362 which is secured to shaft 355. Since the solenoid is energized for only a short time, a spring on the plunger of the solenoid, returns the pawl into the path of the detent 363 to stop the sleeve and disengage the clutch after one revolution of shaft 355.

The cam 365 (FIG. 34) actuates a lever 370 that is clamped on a shaft 371 which is rotatable in the support structure and carries a generally semi-circular plate 372 adjacent each end. At one side of the machine, a chain 375 that is anchored at both ends on the plate 372 is trained over a small sprocket 376 which is keyed to a short shaft 377 journalled for rotation in wall 252 of the conveyor support member 250. A cam 380 keyed to shaft 377 has a cutout portion defined at one side by a slanted wall 381 that is effective, during clockwise rotation of the cam 380, to engage a roller 383 on a carton gripping jaw 384. The engagement of roller 383 by cam 380 causes clockwise pivoting of the jaw 384 against the urging of a spring 388 which is operately connected between a fixed bracket 386 and the jaw. When the jaw 384 is swung inwardly by the cam 380, the jaw grips the end of the carton that is located at the carton closing station. At the other side of the machine, a cam 390 that is identical to cam 380 is keyed to a short shaft 391, which is driven from the plate 372 through a sprocket and chain drive 392, and is effective to swing a second spring loaded jaw 393 inwardly toward the other jaw 384. A spring 394, that is connected between a fixed bracket 395 and the lower end of the plate 372 on the right end (FIG. 34) of shaft 371, urges shaft 371 counterclockwise and maintains the follower roller on lever 370 in engagement with cam 365.

The cam 390 has an arm 396 secured thereto, and the lifter arm 352, that raises the cover of the carton, is secured to the arm 396. The cam 380 also carries an arm 397 that is generally U-shaped and has the cover lifter arm 351 secured thereto. Thus, when the shaft 355 rotates one complete revolution and oscillates the shaft 371, the jaws 384 and 393 grip the ends of the carton and the lifter arms 351 and 352 are swung upwardly to lift the carton cover, as seen in FIGURE 35 and then returned to a lowered position to await the delivery of the next filled carton to the closer unit.

The cam 366 actuates a bellcrank 400 (FIG. 34) that is rotatable on shaft 371 and has one end connected by a pair of links 401 to a lever 402 which is pivoted on a fixed transverse shaft 403. An upper end of lever 402 is pivotally connected to one end of a push rod 405 which has its other end pivoted to an arm 407 that is keyed to a shaft 408. The plate 350 that is effective to lift the carton locking flange, is also secured to shaft 408 which is journalled for rotation in the outer ends of two levers 410 and 411 that are welded to a tubular shaft 412. A spring 413, connected between a pin 14 that connects the links 401 to the bellcrank and an anchor member (not shown) fixed to the support structure, maintains a follower roller on the bellcrank 400 in engagement with the cam 366. When the cam 366 is rotated one complete revolution, the cam initially rotates a short distance without actuating bellcrank 400 and then rotates the bellcrank counterclockwise (FIG. 34) on shaft 371, causing lever 402 to pivot clockwise about shaft 403. Accordingly, push rod 405 is moved to the right to pivot arm 407 counterclockwise and raise the lifter plate 350.

It will be noted in FIGURE 35 that the plate 350 holds the locking flange C1 in raised position as the cover C2 moves downwardly toward the locking flange. After the cover C2 moves into overlapping relation with the upper end of the flange C1, the plate 350 is moved downwardly away from the cover as seen in FIGURE 36. This generally vertical movement of the plate is accomplished by the cam 367 (FIG. 34) that engages a follower roller on a lever 418 which is clamped on the tubular shaft 412. A spring 419, connected between a fixed frame member and the lower end of an arm 420 welded to tubular shaft 412, urges lever 418 counterclockwise to maintain it on cam 367. When the cam 367 starts to rotate, it holds the lever 418 in fixed angular position for a short interval. Then it permits lever 418 to swing counterclockwise to raise the outer ends of arms 410 and 411 and the blade 350 carried thereon. After the blade 350 has been rotated counterclockwise to the solid line position of FIGURE 35 and the cover has descended to engage the locking flange of the carton, the cam 367 swings lever 418 clockwise (FIG. 34) to lower the blade 350. After the blade has been lowered, it is swung clockwise to its initial position.

Referring to FIGURE 2 it will be noted that a pair of adjustable levers 425 and 426, which are anchored at one end on a transverse rod 427, have curved end portions that partially enclose the shaft 355 and provide a braking action on the shaft.

It is evident that if, for some reason, not all of the pockets of a carton are filled when the carton leaves the filling station under conveyor 23, the carton closer should not be operated to close the carton. Accordingly six detector fingers 430 (FIGS. 2 and 3) are disposed above the path of movement of the carton. Each finger is disposed above the path of a pocket of the carton, and is welded to a short tube 431 that is rotatable on a fixed transverse shaft 432 (FIG. 3A). Each finger rests on a transverse rod 434 that is pivotally mounted on the shaft 432 by two short arms 436 and 437. At one end, the rod 434 carries a switch actuator 438 that engages a switch lever of a switch SW1. A torsion spring 442 is anchored at one end in a fixed bracket and has its other end bearing against the top surface of each finger to urge the finger downwardly. Accordingly, when no carton is passing beneath the fingers, the fingers are in a lowered position and the switch SW1 is held closed. When an egg in a pocket of the carton passes under the finger, the finger is raised. However, the switch SW1 will not be allowed to open until all fingers are raised. Accordingly, if there is an empty pocket in the carton, the switch SW1 will not open. As will be seen presently, the opening of switch SW1 is necessary to cause actuation of the carton closer.

A second switch SW2 which has a normally-open set of contacts SW2–O and a normally-closed set of contacts SW2–C is mounted at the left end of the machine (FIG. 3) adjacent the knob 302 of the pawl-shifting lever 290. In FIGURE 3 the lever 290 is in the position in which the pawl is in engagement with the ratchet wheel that is adapted to advance the carton in alternate long and short strokes. In this position the knob 302 engages the actuator of switch SW2 and closes the normally-open contacts SW2–O in the circuit to the carton closer mechanism. When the lever 290 is shifted counterclockwise to shift the pawl for egg flat-feeding operation, the knob 302 will move out of contact with the actuator of switch SW2 and the contacts SW2–O will open, preventing actuation of the closer. Therefore, when the conveyor is set up for effecting the proper indexing movements for flats, the carton closer is de-activated.

Five cams V, W, X, Y and Z are keyed to shaft 262 at the left hand end of the conveyor. Each cam is operatively associated with a switch L$s$V, L$s$W, L$s$X, L$s$Y and L$s$Z respectively as shown in the diagram of FIGURE 37.

During the operation of the conveyor, the solenoid 295 that releases the pawl 285 and permits indexing movement of the conveyor 21 is energized and deenergized by a control system disclosed in the above-mentioned patent to Mumma No. 2,895,274 which is incorporated by reference herein. In general a memory system of the machine of Patent No. 2,895,274 is effective to control the discharge of eggs from the bucket conveyor and to energize the solenoid 295 to advance the cartons or flats when the carton or a flat under the bucket conveyor has been filled. In FIGURE 37 the control system of the main processing machine is indicated by box M and is connected in the electric circuit, between conductors L1 and L2, that contains the solenoid 295.

In the diagram of FIGURE 37, the cams have been oriented in the position they assume when cartons are being advanced on the container conveyor 21 and the second row of pockets is directly under the bucket conveyor 23 in a position to receive eggs from said conveyor. If a condition is assumed in which an egg has been placed in each of the twelve pockets of the carton, then, when the solenoid 295 is energized by the control system M, the pawl 285 (FIG. 31) is raised from notch 310, in ratchet 274, permitting the shaft 262 to rotate clockwise approximately 307 degrees, at which point its rotation is arrested by the pawl engaging in notch 311. During this 307 degree rotation of shaft 262, a recess X1 in cam X is moved to the dotted line position. When the first row of pockets in the next carton is filled and solenoid 295 is energized, the pawl 285 is withdrawn from notch 311 and the shaft 262 rotates approximately 53 degrees, causing the recess X1 of cam X to permit the switch L$s$X to close and energize the closer mechanism solenoid 369 through a closed relay contact R1 of relay R. Accordingly, the pawl 364 (FIG. 2) is withdrawn from the sleeve 361 of clutch 356 permitting the shaft 355 to rotate one full revolution to actuate the closing mechanism 30 to close the filled carton that was positioned at the closing station at the end of the short indexing movement of the conveyor.

It will be noted that the switch SW1 (FIG. 37) which is controlled by the egg-sensing fingers is in a circuit with the switch L$s$V, and that the cam V has two recesses V1 and V2. During the long stroke of the conveyor resulting from the 307 degree rotation of shaft 262, the recess V1 permits switch L$s$V to close just as the first row of eggs in the carton engage the egg-sensing fingers. If an egg is in each pocket, the switch SW1 is held open and, accordingly, the relay R will not be energized. Similarly, the recess V2 permits the switch L$s$V to close when the second row of eggs pass under the egg-detecting fingers. Again, if an egg is in each pocket of the second row, the relay R will not be operated and the carton will be subsequently closed when the solenoid 369 is energized.

However, if an egg is missing from a pocket in either the first or second row of pockets, the switch SW1 will remain closed when that row of pockets pass under the detector fingers, and the simultaneous closing of switch LsV under control of recess V1 and V2, will cause relay R to be energized. Contact R2 is closed, locking in the circuit through switch LsW. Contact R1 in the circuit of the closer solenoid 369 is opened. Accordingly, during the next 53 degree rotation of cam X, the closing of switch LsX under control of recess X1, will not cause the energization of solenoid 369. Thus, if the carton is not completely filled, it will not be closed.

It should be noted that at the start of each 307 degree rotation of the shaft 262, a recess W1 in cam W permits switch LsW to open to de-energize relay R if it is energized. Accordingly at the beginning of each long rotation of the shaft 262, the relay R is opened and the circuit is prepared so that the solenoid 369 can be subsequently energized if all pockets of the carton are filled.

It will, of course, be evident that, if egg flats are being advanced on the conveyor, contacts SW2–O of switch SW2 will be open due to the selective adjustment of the pawl control lever 290 for operation with filler flats. Therefore, even though contacts SW2–C are closed, the closer solenoid cannot be energized because switches LsY and LsZ are never closed at the same time. Thus when flats are being advanced on the conveyor, the closer mechanism 30 is deactivated.

When cartons are being advanced on the conveyor, and contacts SW2–O are closed, rotation of shaft 262 will cause recess Z1 in cam Z to permit switch LsZ to close and energize solenoid 185. As explained above, when solenoid 185 is energized, the carton feeder is actuated to drop a carton onto the conveyor.

When flats are being advanced on the conveyor and contacts SW2–C are closed, rotation of shaft 262 will cause recess Y1 and cam Y to permit switch LsY to close and energize solenoid 185 for dropping a flat onto the conveyor.

It should be noted that the carton dispenser 20 is connected to the carton conveyor unit 22 by means of a latching mechanism 460 (FIG. 2) that includes a pivotally mounted hook 461 that may be manually engaged with and disengaged from a fixed post 462 on the conveyor frame structure.

A brief description of the operation of the machine will be given with particular reference to FIGURE 3. When cartons are being filled the plate 55 (FIG. 13) of the upper container dispensing fingers 47 are moved to their upper position by loosening capscrews 59 and adjusting the plates by moving the slots 60 relative to the capscrews 59. The dispenser is now ready to dispense cartons. To adapt the conveyor 22 for receiving and advancing cartons the lever 290 (FIG. 31) is moved to the position at which pawl 285 is associated with ratchet 274. The speed control knob 333 is manipulated to engage the high speed sprocket 317 with the drive member 337 on shaft 323 (FIG. 30). When this drive connection is made, the conveyor is ready to start its indexing movements as soon as the memory device M of the main processing conveyor energizes solenoid 295 to raise the pawl 285. At the start of an operation, it may be necessary to jog the conveyor a few times by a jogging circuit that will energize solenoid 295 until a carton is properly positioned relative to the bucket conveyor. Cartons can be placed manually on the pushers 258 of the upper run of the conveyor 21 at the start of an operation with the pusher disposed between the body of the carton and the folded back cover C2. Since the cam Z that controls the dropping of the carton is on the same shaft 262 that drives the pushers, the dropping of subsequent cartons is accurately controlled.

As a particular carton advances on conveyor 21, a long indexing movement of the conveyor positions the first row of pockets under the bucket conveyor 23. When this row of pockets has been filled with eggs discharged from the bucket conveyor under control of the memory device of the main processing conveyor, the indexing solenoid 295 is energized to withdraw pawl 285 and permit the carton to be advanced through a short indexing movement to position the second row of pockets under the bucket conveyor. When this row of pockets has been filled, the carton is advanced under the egg-detecting fingers during the next long indexing stroke of the conveyor and then is positioned over the closer mechanism at the end of the next short indexing stroke, at which time the closer mechanism is actuated to close the carton if all the pockets are filled.

To adapt the machine for operation with flats, the plate 55 of each of the upper fingers of the dispenser are adjusted to their lower position. The conveyor is prepared for this operation by shifting the pawl selector lever 290 to engage pawl 285 with ratchet 275, thereby opening contacts SW2–O of switch SW2 and closing contacts SW2–C. The speed control knob 333 is then manipulated to engage the low-speed sprocket 318 with the drive member 337 of shaft 323. The egg-detector fingers are then swung to an elevated position and locked in that position by swinging a spring finger 470 (FIG. 1), that is connected to the transverse bar 434, in a counterclockwise direction. The bar 434 is thus raised and it in turn raises the fingers to an elevated position above the path of eggs in the flats. The spring finger 470 is positioned behind a pin 471 on the side member of the conveyor to lock the detector fingers in elevated position. When these adjustments have been made, the machine will begin its operation as soon as the memory device M of the main processing conveyor energizes solenoid 295 to raise pawl 285. After flats have been placed on the conveyor with the pushers 258, which are approximately 12 inches apart, disposed against the rear edge of the flats, as seen in FIGURE 33, the conveyor is indexed and during one relatively long indexing movement, indicated by letter G, the first row of pockets is brought under the bucket conveyor. When the first row is filled, the conveyor is actuated to move the flat through a short distance E to position the second row under the bucket conveyor, and this procedure is repeated until all rows of the flat have been filled.

From the foregoing description it will be seen that the present invention provides a container handling machine that may be quickly and easily converted from a machine that will handle cartons to one that will handle flats, and vice versa. The shiftable pawl mechanism makes it possible to quickly change the indexing movements of the container conveyor and the speed change mechanism makes it possible to vary the speed of the indexing movements depending upon which container is used. The control mechanism that inactivates the carton closer makes it possible to operate the machine for filling flats without dismounting the carton closer.

While I have described a preferred embodiment of the invention, it will be evident that certain modifications of the apparatus may be made without departing from the teachings of the present invention and, accordingly, it is to be understood that the scope of the invention is to be limited only by the scope and proper interpretation of the claims.

What I claim as new is:

1. Container handling apparatus comprising an open bottom supply magazine adapted to hold a stack of nested containers; means for dispensing containers one by one from said magazine; a conveyor disposed to receive containers from said dispensing means and advance them in predetermined increments of indexing movement; said dispensing means including a plurality of container support and manipulating fingers operable to remove the lowermost container from the stack and direct it to said conveyor; said conveyor comprising an endless conveyor member, power drive means, means connected between said conveyor member and said drive means for varying the speed of advance of said conveying member, and means for varying the size of the increments of indexing movement of the conveyor; said container dispenser comprising a support structure for said magazine, a pair of upper stack-supporting fingers mounted on said structure, one finger being disposed adjacent the lower end of said magazine at each side of the open bottom of the magazine, means mounting each of said stack-supporting fingers for pivotal movement on said structure between an inner position wherein each finger is disposed in supporting engagement with the peripheral edge of containers in the magazine and a position outwardly of the open bottom of the magazine and spaced from the path of downward movement of containers in said magazine, a container discharge housing mounted in said support structure for pivotal movement, a pair of lower container-support fingers pivotally mounted on said housing and disposed adjacent and below said upper fingers on opposite sides of the lower end of said magazine, each lower finger being movable between a position wherein a portion of the finger underlies the lowermost container in the magazine and a position spaced outwardly from said underlying position, means for swinging said lower fingers to said position underlying the lowermost container in the stack and swinging said upper fingers to said inner position in supporting engagement with the opposite peripheral edges of the container next above said lowermost container, means for pivoting said housing downwardly on said support structure to move said lower fingers downwardly toward said conveyor permitting the lowermost container to move downwardly while leaving the rest of the stack supported in elevated position on said upper fingers, and means for swinging said lower fingers outwardly away from said underlying position to permit the lowermost container to be deposited on said conveyor.

2. The apparatus of claim 1 wherein the pivoting means for said container-discharging housing comprises a power-driven cam operatively connected between said support structure and said discharge housing.

3. The apparatus of claim 1 wherein the pivoting means for said container-discharge housing comprises a control housing pivoted in said support structure, and power-driven cam means carried by said discharge housing and engaging said control housing to urge said control housing downwardly toward said conveyor, and means connected between said housings for causing said discharge housing to move downwardly with said control housing.

4. The apparatus of claim 1 wherein the pivoting means for the container-discharge housing comprises a control housing pivoted in said support structure, a power-driven camshaft carried by said discharge housing, cam means on said camshaft in engagement with said control housing and arranged to move said control housing downwardly during rotation of said camshaft, means defining a slot in said control housing, an abutment member bodily movable with said discharge housing and disposed in said slot for engaging a wall of said slot to urge said discharge housing downwardly with said control housing.

5. The apparatus of claim 1 including an abutment surface on said support structure, an abutment member on said container-discharge housing means for moving said member from a locking position wherein downward movement of said discharge housing is restricted by engagement of said abutment member with said abutment surface and a position spaced from said locking position and permitting downward movement of said container-discharge housing.

6. Container handling apparatus comprising an open bottom supply magazine adapted to hold a stack of nested containers; means for dispensing containers one by one from said magazine; a conveyor disposed to receive containers from said dispensing means and advance them in predetermined increments of indexing movement; said dispensing means including a plurality of container support and manipulating fingers operable to remove the lowermost container from the stack and direct it to said conveyor; said conveyor comprising an endless conveyor member, power drive means, means connected between said conveyor member and said drive means for varying the speed of advance of said conveying member, and means for varying the size of the increments of indexing movement of the conveyor; said conveyor having a plurality of spaced pushers thereon; said drive means comprising a power-driven shaft; and said speed-varying means comprising a drive member on said shaft, a pair of sprockets of different size slidable on said shaft, a chain operatively connecting each sprocket to said endless conveyor member, an actuating member connected to both of said sprockets, and means connected to said actuating member for selectively moving one of said sprockets into engagement with the drive member on said shaft.

7. Container handling apparatus comprising an open bottom supply magazine adapted to hold a stack of nested containers; means for dispensing containers one by one from said magazine; a conveyor disposed to receive containers from said dispensing means and advance them in predetermined increments of indexing movement; said dispensing means including a plurality of container support and manipulating fingers operable to remove the lowermost container from the stack and direct it to said conveyor; said conveyor comprising an endless conveyor member, power drive means, means connected between said conveyor member and said drive means for varying the speed of advance of said conveying member; means for varying the size of the increments of indexing movement of said conveyor comprising a shaft in driving engagement with said endless conveyor member, a pair of circular ratchets concentric with said shaft and joined together, each ratchet having notches spaced around its periphery and the spacing of the notches on one ratchet being different than the spacing of the notches on the other ratchet, a drive-member operatively connected between said ratchets and said shaft, a pawl for restricting rotation of said ratchets, a rotatable member driven by said power drive means and operatively associated with said ratchets and with said shaft to establish drive connection between said ratchets and said shaft upon release of said ratchets, means for quickly moving said pawl out of engagement with said ratchets, spring means for holding said pawl on the periphery of an associated ratchet and urging it into the next notch passing thereunder, and means for selectively moving said pawl into operative engagement with either of said ratchets whereby the distance between notches on the associated ratchet will determine the duration of the driving connection between said ratchet and said shaft, and the different spacing between the notches on said ratchets will cause different increments of indexing movement of said conveyor.

8. Container handling apparatus comprising an open bottom supply magazine adapted to hold a stack of nested containers; means for dispensing containers one by one from said magazine; a conveyor disposed to receive containers from said dispensing means and advance them in predetermined increments of indexing movement; said dispensing means including a plurality of container support and manipulating fingers operable to remove the lowermost container from the stack and direct it to said conveyor; said conveyor comprising an endless conveyor member, power drive means, means connected between said conveyor member and said drive means for varying the speed of advance of said conveying member, and means for varying the size of the increments of indexing movement of the conveyor; a container-closing mechanism adjacent an end portion of said conveyor for closing containers having a central pocketed body portion, a locking flange hinged to the leading side of said body portion and a cover hinged to the trailing side of the body portion, said closing mechanism comprising a container gripping mechanism, a flange-folding mechanism and a cover-folding mechanism, and means for actuating said container-gripping mechanism, said flange-folding mechanism, and said cover-folding mechanism so as to consecutively grip the container, raise the flange to an upwardly and rearwardly inclined position, and bring said cover over said upraised flange.

9. Container handling apparatus comprising an open bottom supply magazine adapted to hold a stack of nested containers; means for dispensing containers one by one from said magazine; a conveyor disposed to receive containers from said dispensing means and advance them in predetermined increments of indexing movement; said dispensing means including a plurality of container support and manipulating fingers operable to remove the lowermost container from the stack and direct it to said conveyor; said conveyor comprising an endless conveyor member, power drive means, means connected between said conveyor member and said drive means for varying the speed of advance of said conveying member and means for varying the size of the increments of indexing movement of the conveyor; a container-closing mechanism adjacent an end portion of the conveyor for closing containers having a central pocketed body portion, a locking flange hinged to the leading side of said body portion, and a cover hinged to the trailing side of said body portion, said closing mechanism comprising a flange folding mechanism mounted on said conveyor for pivoting about a first axis to engage the locking flange of the container and pivot it upwardly as said flange holding mechanism moves to a raised position and for bodily swinging movement about a second axis for downward movement from said raised position along a relatively straight line path to release the locking flange.

10. The apparatus of claim 9 further characterized by a cover folding mechanism for folding the cover of the container upwardly and forwardly over the central body portion of the container, and means for coordinating the actuation of said flange folding mechanism and said cover folding mechanism to consecutively pivot said flange folding mechanism about said first axis to the raised position to swing the container locking flange to an upwardly inclined position overlying the body portion of the container, swing the container cover to closing position over the body portion and partially overlying the upwardly inclined locking flange, and then swing said flange folding mechanism downwardly about said second axis as said cover moves into overlying relation with the locking flange.

11. Container handling apparatus comprising a conveyor having a plurality of spaced pushers for moving a series of egg cartons; said cartons having a central pocketed body portion, a locking flange hinged to the leading side of said body portion and a cover hinged to the trailing side of said body portion; means for intermittently driving said conveyor to advance said cartons; and carton closing means comprising a carton gripping mechanism operable to grip a carton when its pockets have been filled with eggs and when the conveyor is stopped, a flange-folding mechanism positioned in the path of said carton for folding said flange into an upwardly and slightly rearwardly inclined position, and a cover-folding mechanism for folding said cover forwardly and over said flange to close said carton.

12. Container handling apparatus as set forth in claim 11 wherein said flange folding mechanism comprises a plate, means for pivoting said plate about a first axis to engage said locking flange and pivot it to said upwardly and rearwardly inclined position, and means for swinging said plate about a second axis to bring it downwardly in a generally straight line path parallel to said locking flange while said cover is received over said flange 13. Container handling apparatus as set forth in claim 11 wherein said carton gripping mechanism comprises a pair of jaws positioned at opposite sides of said conveyor, and means for moving said jaws into gripping engagement with the lateral side faces of the carton prior to the folding of said cover and said locking flange.

14. Container handling apparatus as set forth in claim 11 including means for detecting the absence of eggs from any of the pockets of said carton, said detecting means being located upstream from said carton closing means, and control means actuated by said detecting means for actuating said carton closing means only when all of said pockets are filled with eggs.

15. Container handling apparatus as set forth in claim 14 wherein said detecting means comprises a plurality of fingers extending in the path of each of the eggs in a transversely extending row of eggs in the carton.

16. Container handling apparatus as set forth in claim 11 wherein said cover-folding mechanism includes a pair of lift fingers mounted adjacent opposed sides of the conveyor, and means for oscillating said fingers about a transversely extending axis to lift said cover by the lateral side edges thereof and swing it forwardly through an arc of 180° to close said carton.

References Cited

UNITED STATES PATENTS

| | | | |
|---|---|---|---|
| 3,104,029 | 9/1963 | Carkhuff | 221—221 X |
| 3,342,012 | 9/1967 | Reading | 53—246 X |

THERON E. CONDON, *Primary Examiner.*

R. L. SPRUILL, *Assistant Examiner.*

U.S. Cl. X.R.

53—160, 246, 249, 376; 198—110; 221—221

UNITED STATES PATENT OFFICE
CERTIFICATE OF CORRECTION

Patent No. 3,447,282                                     June 3, 1969

Harold J. Mumma

It is certified that error appears in the above identified patent and that said Letters Patent are hereby corrected as shown below:

Column 10, line 18, "sprocked" should read -- sprocket --; line 58, "operately" should read -- operatively --. Column 11, line 18, "14" should read -- 414 --. Column 13, line 10, "and" should read -- or --. Column 17, line 36, "holding" should read -- folding --. Column 18, line 3, after "portion" insert a comma.

Signed and sealed this 10th day of November 1970.

(SEAL)
Attest:

Edward M. Fletcher, Jr.                        WILLIAM E. SCHUYLER, JR.
Attesting Officer                                    Commissioner of Patents